United States Patent [19] [11] 4,019,967
Tsuchihashi et al. [45] Apr. 26, 1977

[54] METHOD OF USING VITREOUS SOLID ELECROLYTE

[75] Inventors: Shoji Tsuchihashi; Yoji Kawamoto, both of Kobe; Masayoshi Inoue, Sakai, all of Japan

[73] Assignee: Minolta Camera Kabushiki Kaisha, Osaka, Japan

[22] Filed: Oct. 7, 1975

[21] Appl. No.: 620,350

Related U.S. Application Data

[63] Continuation of Ser. No. 444,802, Feb. 22, 1974, abandoned.

[30] Foreign Application Priority Data

Feb. 28, 1973 Japan ............................. 48-23858
Feb. 28, 1973 Japan ............................. 48-23859

[52] U.S. Cl. .............. 204/1 T; 204/195 S; 429/91; 252/62.2; 73/339 R
[51] Int. Cl.² ................ G01N 27/46; H01M 6/18; H01G 9/00
[58] Field of Search ............ 204/1 T, 195 R, 195 S, 204/195 G, 195 M; 106/47 R; 136/86 F, 153; 252/62.2; 429/91; 73/339 R

[56] References Cited
UNITED STATES PATENTS

| | | | |
|---|---|---|---|
| 3,177,082 | 4/1965 | MacAvoy | 106/47 R |
| 3,708,729 | 1/1973 | Berger | 252/62.2 |
| 3,709,813 | 1/1973 | Johnson et al. | 204/195 G |
| 3,821,100 | 6/1974 | Hilton et al. | 204/1 T |

OTHER PUBLICATIONS

Goryunova et al, "Soviet Phys. Solid St.", vol. 2, 1960, pp. 258–261.

Primary Examiner—T. Tung
Attorney, Agent, or Firm—Wenderoth, Lind & Ponack

[57] ABSTRACT

The disclosure is directed to substances composed of arsenic, sulphur and silver or of germanium, sulphur and silver in a certain range of proportions which may produce electrolytes having standard electrical properties, and also having stable vitreous state, whereby the electrolytes are easy to work and manufacture as small circuit elements.

4 Claims, 9 Drawing Figures

METHOD OF USING VITREOUS SOLID ELECROLYTE

This is a continuation, of application Ser. No. 444,802, filed Feb. 22,1974, now abandoned.

The present invention relates to a solid electrolytic material, and more particularly to an easily workable vitreous electrolyte presenting high ionic conduction, and having an As-S-Ag composition or a Ge-S-Ag composition.

There has recently been considerable development of electrolytic materials in the solid state, as opposed to previously developed liquid electrolytes. Solid electrolytes function in the same basic manner as liquid electrolytes, but present the advantages that problems relating to the physical support of the electrolyte are vastly simplified, and that small, light-weight cells or elements for use in electronic circuits can be produced, solid state electrolytes thus finding particular application in equipment wherein lightness and compactness are at a premium, such equipment generally including any devices which are transportable, i.e., either power-driven vehicles, or manually carried items of equipment. To date, there have been successfully developed a variety of solid electrolytes, composed of, for example, silver halides, silver chalcogenide, and halogenated alkali metal crystals, or multicomponent compounds having these substances as principal components. However, as all these substances are obtained in a crystalline form, there are certain disadvantages relating to practical use thereof, and the production of cells or circuit elements therefrom, it normally being necessary to produce a powder with suitable characteristics by crushing the crystals obtained, and then forming the powder to a required shape by sintering, employing a press, molding with binder, or similar procedure, which means that the difficulty and length of time of production are increased and higher equipment investment per electrolyte unit is required.

In consideration of these disadvantages, the present inventors have made systematic researches to obtain a solid state electrolytic material having electrical characteristics comparable to those of conventional solid electrolytes, but which also presents great ease of workability. The reearches were directed to finding an electrolytic substance that solidifies to a non-crystalline form, i.e., a vitreous electrolyte, and the basis of the work was the known fact that molten sulfide glass can function as a dispersion medium for silver. As a result of these researches, the present inventors have provided novel types of solid electrolytes, which consist of the ternary systems which are As-S-Ag and Ge-S-Ag, which have good electrical conduction characteristics, conduction being almost completley ionic, and which are substances having vitreous states whereby the production of cells or other circuit elements is greatly facilitated.

These and other advantages of the present invention will become apparent upon reading of the following full description in conjunction with the attached drawings, in which, FIG. 1A is a phase diagram indicating atomic percentages of elements in As-S-Ag test material system according to the invention;

Figure 1:
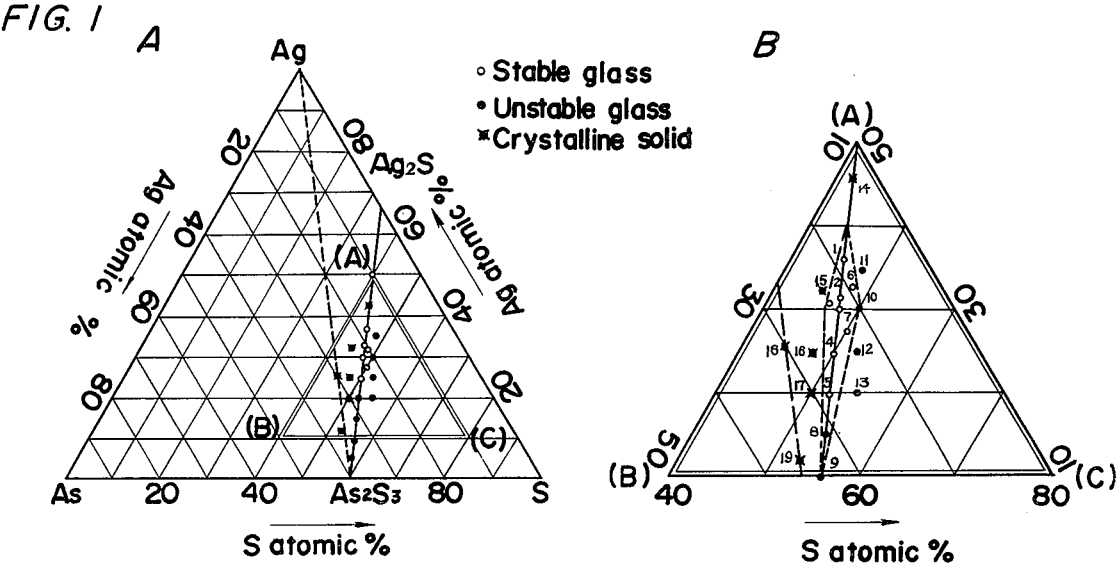
FIG. 1B is an enlargement of the triangular portion marked (A), (B), (C) in the phase diagram of FIG. 1A.

Referring first to FIG. 1, there are shown the compositions of As—S—Ag solid solutions obtained by the addition of silver to a molten sulfide glass having an As-S composition. In both FIG. 1A and FIG. 1B, the open circles indicate compositions which, upon solidification, give a stable glass, the blocked circles indicate compositions which result in an unstable glass, and the crosses indicate compositions which result in a crystalline solid. The area of useful compositions was found to center on that portion of the solid straight line drawn between the points $As_2S_3$ and $Ag_2S$ over which the Ag atomic percentage ranges from 10 to 40%, and to lie within the quadrilateral defined by the points $As_{34}S_{56}Ag_{10}$, $As_{20}S_{50}Ag_{30}$, $As_{16}S_{44}Ag_{40}$, and $As_{23.5}S_{46.5}Ag_{30}$. This quadrilateral is contained within the triangle marked (A), (B), and (C) in FIG. 1A, which triangle is shown in enlarged from in FIG. 1B.

As opposed to most sulfide glasses, in which conduction is mainly electronic, conduction in the glasses having compositions according to the invention is almost entirely ionic, being provided by silver ions, and electronic conduction may be practically ignored. Specific conductivity in vitreous solid electrolytes according to the invention is comparatively high, being in the range $10^{-4} - 10^{-6} \Omega^{-1} cm^{-1}$.

The description will continue below in reference to the preparation, characteristics, and examples of use of electrolytic substances lying within the specified range in FIG. 1.

EXAMPLE 1

99.999% pure arsenic (As), sulfur (S), and silver (Ag) were weighed into quantities of 4.495g, 4.810g, 12.944g, respectively, and put into a quartz ampoule, which had been washed and thoroughly dried, after which the pressure inside the ampoule was reduced to $10^{-3}$mmHg, and the ampoule was sealed. The ampoule and its contents were then put into a tube furnace, which was mounted in a manner to permit see-saw motion thereof. The furnace contents were heated to 600° C, and held at this temperature for two hours, during which time, the molten contents of the quartz ampoule were agitated by see-saw motion of the furnace, there being 5 complete see-saw motions per minute. At the end of the two hours, the quartz ampoule together with its molten contents, was removed from the furnace, and quenched in water immediately thereafter. The product obtained, upon solidification of the ampoule contents, was in a black vitreous state, which was examined both microscopically and by means of a polarization microscope, and was found to be a homogeneous substance with no phase separation.

EXAMPLES 2 – 19

In Examples 2 –19, samples were prepared, heated, and quenched under the same conditions as for the sample of Example 1, with the difference that the samples contained As, S, Ag in various proportions, and were heated for various lengths of time. The compositions of the samples used in Examples 1 – 19 are shown in Tables 1 — 1 and 1 — 2, below. In Tables 1 — 1, and 1 — 2, the sample numbers correspond to Example numbers, i.e., Sample No. 1 was used in Example 1, and so on. These sample numbers are also indicated in the enlarged portion of the phase diagram in FIG. 1B.

In Examples 2 – 10, As, S, Ag mixtures, in the proportions indicated in Table 1 – 1, were prepared and heated for the times also indicated in Table 1 — 1. In all cases, a homogeneous vitreous substance was obtained.

The samples used in Examples 11 – 19 had the compositions indicated in Table 1 – 2, and were all held at 600° C for five hours, conditions being otherwise as in Example 1. The substances obtained from samples 11 – 19, all were in a vitreous state, but showed tendencies to devitrification. For example, free sulphur appeared at the surface of the glass, or there was some precipitation of crystals within the glass.

Table 1 - 1

| Sample No. | Sample Composition, Treatment | | | |
|---|---|---|---|---|
| | As | S | Ag | Remarks |
| 1 | 4.495g (18) | 4.810g (45.25) | 12.944g (36.75) | 2 hours at 600° C; water quenched. Stable glass obtained |
| 2 | 5.860g (21) | 4.680g (47.25) | 10.495g (31.75) | 3 hours at 600° C; water quenched. Stable glass obtained |
| 3 | 6.593g (22) | 6.156g (48) | 12.944g (30) | 5 hours at 600° C; water quenched. Stable glass obtained |
| 4 | 11.238g (25) | 9.619g (50) | 16.181g (25) | 5 hours at 600° C; water quenched. Stable glass obtained |
| 5 | 8.391g (28) | 6.669g (52) | 8.630g (20) | 7 hours at 600° C; water quenched. Stable glass obtained |
| 6 | 5.113g (19.5) | 5.386g (48) | 12.270g (32.5) | 5 hours at 600° C; water quenched. Stable glass obtained |
| 7 | 6.743g (22.5) | 6.421g (50) | 11.866g (27.5) | 5 hours at 600° C; water quenched. Stable glass obtained |
| 8 | 13.935g (31) | 10.398g (54) | 9.708g (15) | 5 hours at 600° C; water quenched. Glass obtained, but slightly unstable. |
| 9 | 12.737g (34) | 8.978g (56) | 5.394g (10) | 5 hours at 600° C; water quenched. Glass obtained, but slightly unstable. |
| 10 | 5.994g (20) | 6.421g (50) | 12.944g (30) | 5 hours at 600° C; water quenched. Glass obtained, but slightly unstable. |

Note: In the Table, the number in brackets below each number specifying a weight of As, S or Ag, is the corresponding atomic percentage.

Table 1 - 2

| Sample No. | Sample Composition, Results | | | |
|---|---|---|---|---|
| | As | S | Ag | Remarks |
| 11 | 5.095g (17) | 6.156g (48) | 15.102g (35) | Material obtained was a glass, but with free sulphur precipitated at surface. |
| 12 | 6.743g (22.5) | 6.733g (52.5) | 10.787g (25) | Material obtained was a glass, but with free sulphur precipitated at surface. |
| 13 | 7.492g (25) | 7.053g (55) | 8.630g (20) | Material obtained was a glass, but with free sulphur precipitated at surface. |
| 14 | 4.810g  3Ag$_2$S . As$_2$S$_3$ | 3.746g | 16.181g | Some precipitation of crystals within the glass. |
| 15 | 6.743g (22.5) | 5.771g (45) | 14.023g (32.5) | Some precipitation of crystals within the glass. |
| 16 | 8.241g (27.5) | 6.091g (47.5) | 10.787g (25) | '' |
| 17 | 8.950g (30) | 6.421g (50) | 8.628g (20) | '' |
| 18 | 8.990g (30) | 5.771g (45) | 10.787g (25) | '' |
| 19 | 10.639g (35.5) | 6.733g (52.5) | 5.178g (12) | '' |

Subsequently, tests were carried out to determine the conductivity of the sample glasses obtained in Examples 1 – 9 above, the procedure being as follows.

Both sides of each sample were given a mirror surface finish, by polishing the sample by the same general means and procedure as employed for polishing optical glass, and sample chips 1 were prepared. In all sample chips 1 the mirror surface was one centimeter square. The thickness of the different sample chips 1 varied from 1 to 2 millimeters. After preparation of all the chips 1, these dimensions were carefully checked again.

The description will continue in reference to subsequent procedure for a single sample chip 1, it being understood that procedure for all other sample chips 1 was the same.

The sample chip 1 was sandwiched in a generally central position between two sheets of glass, whose inside surfaces, i.e., the surfaces thereof adjacent to the chip 1, had been previously coated with a mold release agent. Molten casting epoxy resin (Epolac G 205P) was poured between the sheets of glass, and around the sample chip 1, and then allowed to harden. After the epoxy resin had hardened, the glass plates were removed, thus leaving an epoxy resin sheet 2 in which the sample chip 1 was embedded, as illustrated in FIG. 2A.

Figure 2:
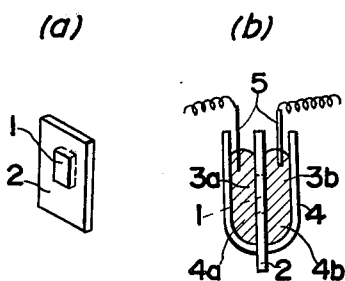
FIG. 2A is a perspective view of a sample glass embedded in an epoxy resin sheet.
FIG. 2B is a sectional view of a resistivity metering cell.

Referring to FIG. 2B, there was prepared a test tube in the bottom of which a generally central vertical cut was made, thus dividing the lower part of the test tube in two approximately equal parts. The epoxy resin sheet 2 was inserted upwards into this central cut a distance sufficient to bring the sample chip 1 embedded in the sheet 2 to within the test tube. In this configuration, the epoxy resin sheet 2 projected to either side and to below the exterior of the test tube and divided the lower part of the interior of the test tube into two compartments 4a and 4b. The junction line between the test tube and the epoxy resin sheet 2 was sealed, and then a silver amalgam, in which the atomic percentage of silver was 1%, was poured into each compartment 4a, 4b, to a height below the top of the epoxy resin sheet 2, thus forming two pools 3a and 3b. The abovementioned unit, shown in FIG. 2B, was employed as a resistivity metering cell, the silver amalgam pools 3a, 3b being employed as electrodes. The silver amalgam pools 3a and 3b were connected through leads 5 to opposite terminals of a constant voltage unit (Toshiba Constant Voltage Unit 3051), and a voltage of 1.00 V was impressed across the silver amalgam pools 3a and 3b. To determine the resistivity of the chip 1 in the epoxy resin sheet 2, the current that flowed in the cell, while this voltage of 1.00 V was maintained, was measured by means of an electrometer (Keysleigh Multi-Electrometer 610B).

Figure 3:
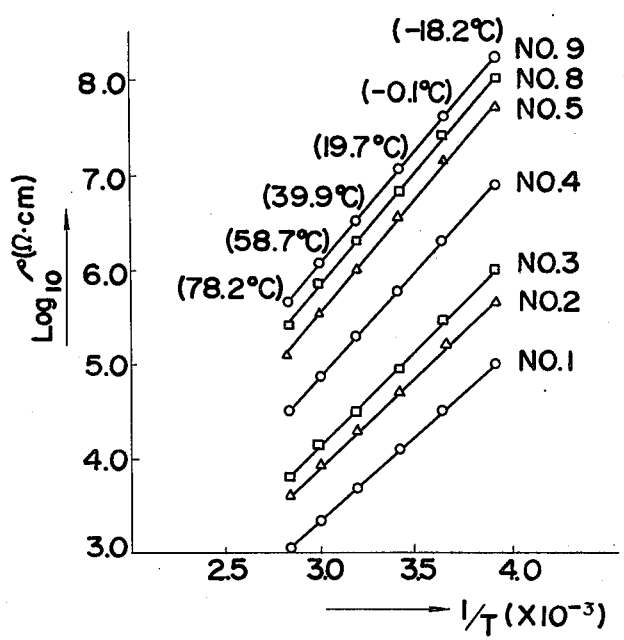
FIG. 3 is a graph of resistivity measurement date for As-S-Ag test material system obtained with the cell of FIG. 2B.

As noted above, the same procedure was carried out for all Samples Nos. 1 – 9. FIG. 3 shows the values of resistivity obtained at different temperatures with Sample Nos. 1 – 5, 8 and 9, these samples being the samples having compositions lying on the straight line between the points marked $As_2S_3$ and $Ag_2S$ in FIG. 1A.

Figure 4:
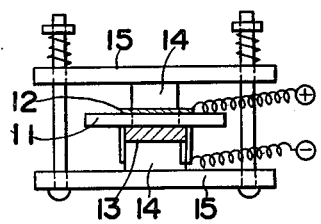
FIG. 4 is a structural drawing of a concentration cell employing a vitreous solid electrolyte according to the invention.

After the above tests, the electromotive force of sample glasses was determined by means of concentration cells, constructed as shown in FIG. 4. Each concentration cell consisted of an epoxy resin sheet 11, in which was embedded a sample chip 1, and on opposite sides of which there were provided a sheet of silver foil 12 and a small block 13 of a mixture consisting of graphite carbon and iodine in the ratio 1 : 2. The silver foil 12 and graphite carbon-iodine block 13 contacted opposite sides of the sample chip 1, to act as electrodes, and were connected to opposite terminals of an external metering means. The foil 12 and block 13 were maintained in good contact with the chip 1 by silicon rubber pads 14, on which a suitable pressure was applied by a press frame 15, the complete cell thus being contained within the press frame 15. Values of electromotive force obtained were as indicated immediately below.

| Sample No. | Glass Thickness (mm) | E.M.F. (V) | Temperature (° C) |
|---|---|---|---|
| 1 | 1.395 | 0.685 | 17.7 |
| 2 | 1.386 | 0.690 | 18.0 |
| 4 | 1.822 | 0.680 | 17.4 |
| 4 | 2.375 | 0.680 | 17.4 |

As is evident from these results, an electrolyte cell according to the invention produces an electromotive force which well matches that produced by a conventional cell, such as one employing $Ag_3SI$, for example.

To determine whether conduction in an electrolyte of the invention is electronic or ionic, there was effected a test employing a cell constructed in the manner described above, in reference to FIG. 2B. The method of the test was to make a comparison between the amount of current flow and of silver deposition at an electrode. Sample No. 4 was employed for the glass chip 1', which was 1.822 mm thick. A silver amalgam was put into one compartment 4a', to serve as the anode, and mercury was put into the other compartment 4b', to serve as the cathode. As indicated below, the amount of silver deposited at the cathode was found to be in close agreement with the amount to be expected for the given current flow, presuming ionic conduction.

| Calculated Value | Amount Deposited | Measuring Instrument Precision |
|---|---|---|
| 21.58mg. | 21.760mg. | ± 1 % |

The amount of silver actually deposited being around 99 ± 1% the calculated deposition, conduction in the electrolyte of the invention is shown to be ionic.

The general results of the researches show that stable vitreous electrolytes, having good electrical qualities, may be obtained from substances having compositions lying within the quadrilateral having apices at the points $As_{34}S_{56}Ag_{10}$, $As_{20}S_{50}Ag_{30}$, $As_{16}S_{44}Ag_{40}$, $As_{23.5}S_{46.5}Ag_{30}$ shown in FIGS. 1A and 1B. Substances having compositions lying outside this quadrilateral were found to be unsuited to the production of solid electrolytes meeting the aims of the invention. In particular, the atomic percentage of silver should be kept above 10%, since it was found that with mixtures having concentrations of silver less than 10% atomic, although a glass was obtained, the glass was unstable, and electrolytic activity and electromotive force go to zero.

Figure 5:
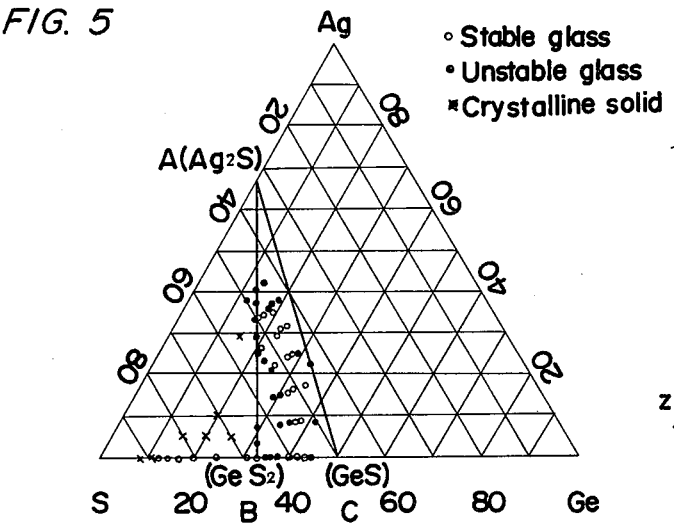
FIG. 5 is an Ge-S-Ag phase diagram indicating test material compositions.
Figure 6:
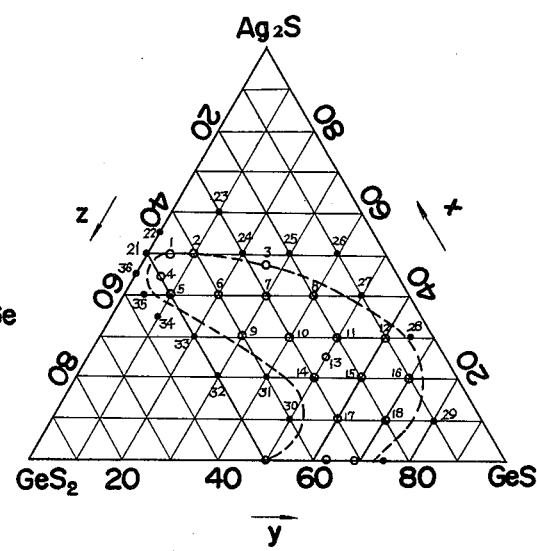
FIG. 6 is an $Ag_2S$—$GeS_2$—$GeS$ phase diagram indicating the area of useful compositions according to the invention.

Referring now to FIGS. 5 and 6 showing a Ge-S-Ag phase diagram and an $Ag_2S$-$GeS_2$-$GeS$ phase diagram respectively, the open circles in the diagrams indicate compositions resulting in a stable glass, blocked circles indicate compositions which result in an unstable glass, and crosses indicate compositions which result in a crystalline solid in the similar manner as in FIG. 1. As stated earlier, the object of the researches was to obtain a substance which, when solid, has both a vitreous state and the qualities of an electrolyte. Thus, certain compositions were of no use, for the purposes of the invention. For example, in FIG. 5, a composition in which the atomic percentage of silver is brought to zero results in a solid which is vitreous, but which provides no electromotive force. Still in FIG. 5, the useful compositions were found to cluster in a triangle with apices at A, B, C, where A lies at a point representing an $Ag_2S$ component, B at a point representing a $GeS_2$ component, and C at a point representing a GeS component. Research was therefore continued in more particular respect to this area, and as a result the invention provides a vitreous solid electrolyte, having a composition with the general formula $xAg_2S$-$yGeS$-$zGeS_2$, wherein $x$, $y$, and $z$ are molar percentages, $x + y + z = 100$, and $10 < x < 50$, $5 < y < 75$, and $5 < z < 55$. This range is indicated under the area of the dotted curved line in the $Ag_2S$-$GeS_2$-$GeS$ phase diagram of FIG. 6. For substances with compositions lying outside the area under the curved line, it was found that the substances did not meet both criteria of the research. For example, with compositions in which $x$ is less than 10, the solid obtained is a stable glass, but does not have the characteristics of an electrolyte. However, with substances having compositions lying in the indicated area, there may be obtained stable glass with good qualities as an electrolyte, the vitreous electrolytes obtained having a conductivity of $10^{-3} - 10^{-7} \Omega^{-1} cm^{-1}$ at room temperature, and, when employed in a concentration cell, providing an electromotive force of up to 0.670 V.

The description will continue below in reference to the preparation, testing, and characteristics of electrolytic substances lying within the specified range in FIG. 6.

EXAMPLE 1'

99.999% pure (5N) germanium (ge), sulphur (S), and silver (Ag) were weighed into quantities of 4.718g, 6.043g, and 14.023g, respectively, and put into a quartz ampoule, which had been washed and thoroughly dried, after which the pressure inside the ampoule was reduced to $10^{-3}$ mmHg, and the ampoule was sealed. The ampoule and its contents were then put into a tube furnace, which was mounted in a manner to permit see-saw motion thereof. The furnace contents were heated to 900° C, and held at this temperature for 6 hours, during which time, the molten contents of the quartz ampoule were agitated by see-saw motion of the furnace, there being 5 complete see-saw motions per minute. At the end of the 6 hours, the quartz ampoule together with its molten contents, was removed from the furnace, and quenched in water. The product obtained upon solidification of the ampoule contents was in a black vitreous state, which was examined both microscopically and by means of a polarization microscope, and was found to be a homogeneous substance with no phase separation.

EXAMPLES 2' – 18'

99.999% pure Ge, S, Ag, in the proportions indicated in Table 1' – 1 were treated in the same manner as the sample of Example 1'. The resulting substances were in homogeneous vitreous states.

EXAMPLES 21 – 36

99.999% pure Ge, S, Ag, in the proportions indicated in Table 1' – 2, were treated in the same manner as the sample of Example 1'. The resulting substances obtained were glasses, but within which there was some precipitation of crystals.

In Table 1' — 1 and 1' – 2, the sample numbers correspond to example numbers, i.e., Sample No. 1' was used in Example 1', and so on. The samples are also identified by these numbers in the phase diagram of FIG. 6.

Table 1' - 1

| Sample No. | Proportion (by weight) | | | Molar percentages in $Ag_2S$-GeS-$GeS_2$ composition | | |
|---|---|---|---|---|---|---|
| | Ag (g) | Ge (g) | S (g) | x | y | z |
| 1' | 14.023 | 4.718 | 6.043 | 50 | 5 | 15 |
| 2' | 14.023 | 4.718 | 5.835 | 50 | 10 | 40 |
| 3' | 14.346 | 5.241 | 5.604 | 48 | 26 | 26 |
| 4' | 12.621 | 5.190 | 6.252 | 45 | 5 | 50 |
| 5' | 12.081 | 6.098 | 6.733 | 40 | 10 | 50 |
| 6' | 12.081 | 6.098 | 6.284 | 40 | 20 | 40 |
| 7' | 12.081 | 6.098 | 5.835 | 40 | 30 | 30 |
| 8' | 12.081 | 6.098 | 5.386 | 40 | 40 | 20 |
| 9' | 9.708 | 7.622 | 6.733 | 30 | 30 | 40 |
| 10' | 9.708 | 7.622 | 6.252 | 30 | 40 | 30 |
| 11' | 10.355 | 8.029 | 6.156 | 30 | 50 | 20 |
| 12' | 10.355 | 9.292 | 5.700 | 30 | 60 | 10 |
| 13' | 8.629 | 8.711 | 6.421 | 25 | 50 | 25 |
| 14' | 7.355 | 9.872 | 7.085 | 20 | 50 | 30 |
| 15' | 7.335 | 9.872 | 6.540 | 20 | 60 | 20 |
| 16' | 7.766 | 10.453 | 6.348 | 20 | 70 | 10 |
| 17' | 4.315 | 13.066 | 6.733 | 10 | 60 | 30 |
| 18' | 4.315 | 13.066 | 7.694 | 10 | 70 | 20 |

Table 1' - 2

| Sample No. | Proportion (by weight) | | | Molar percentages in $Ag_2S$-GeS-$GeS_2$ composition | | |
|---|---|---|---|---|---|---|
| | Ag (g) | Ge (g) | S (g) | x | y | z |
| 21 | 14.023 | 4.718 | 6.252 | 50 | 0 | 50 |
| 22 | 14.832 | 4.083 | 5.811 | 55 | 0 | 45 |
| 23 | 16.180 | 3.630 | 5.210 | 60 | 10 | 30 |
| 24 | 15.102 | 5.081 | 5.835 | 50 | 20 | 30 |
| 25 | 15.102 | 5.081 | 5.386 | 50 | 30 | 20 |
| 26 | 15.102 | 5.081 | 4.937 | 50 | 40 | 10 |
| 27 | 12.944 | 6.533 | 5.290 | 40 | 50 | 10 |
| 28 | 10.355 | 8.130 | 5.386 | 30 | 65 | 5 |
| 29 | 4.315 | 13.066 | 7.053 | 10 | 80 | 10 |
| 30 | 4.099 | 12.413 | 8.528 | 10 | 50 | 40 |
| 31 | 6.904 | 9.292 | 7.181 | 20 | 40 | 40 |
| 32 | 6.904 | 9.292 | 7.694 | 20 | 30 | 50 |
| 33 | 9.708 | 7.622 | 7.214 | 30 | 20 | 50 |
| 34 | 11.326 | 7.078 | 7.454 | 35 | 10 | 55 |
| 35 | 12.081 | 6.098 | 6.957 | 40 | 5 | 55 |
| 36 | 12.621 | 4.991 | 6.212 | 35 | 0 | 65 |

Figure 7:
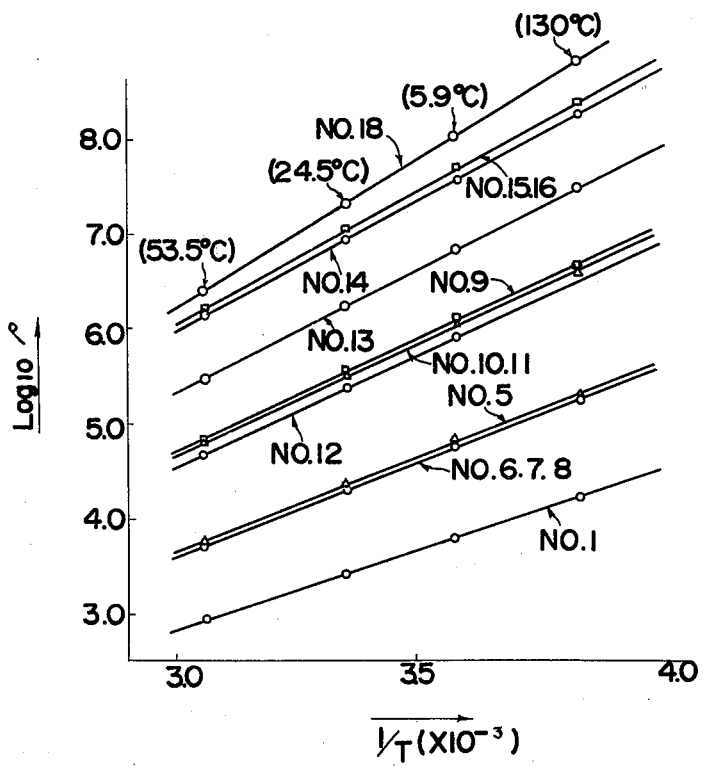
FIG. 7 is a graph of resistivity data obtained with the cell of FIG. 2B.

Subsequently, tests were carried out to determine the conductivity of the sample glasses obtained in Examples 1' 14 18' above, with exactly the same procedure as for the As-S-Ag composition mentioned earlier, preparing sample chips from the sample glasses and using the resistivity metering cell as shown in FIGS. 2A and 2B. Results of the measurements at various temperatures are plotted in the graph of FIG. 7.

After the above tests, the electromotive force of sample glasses was determined by means of concentration cells, as shown in FIG. 4. The construction of the concentration cell and the testing procedure are exactly the same as one employed for testing the sample glasses of the As-S-Ag composition mentioned earlier. Values of electromotive force obtained were as indicated immediately below.

| Sample No. | Glass Thickness (mm) | E.M.F. (V) | Temperature (° C) |
|---|---|---|---|
| 1' | 1.133 | 0.660 | room temp. (17.0 – 17.7) |
| 5' | 1.112 | 0.667 | " |
| 7' | 1.513 | 0.660 | " |
| 8' | 1.708 | 0.670 | " |
| 11' | 1.365 | 0.667 | " |
| 13' | 2.134 | 0.661 | " |
| 15' | 1.107 | 0.663 | " |
| 17' | 0.808 | 0.662 | " |

As is evident from these results, an electrolyte cell according to the invention produces an electromotive force which well matches that produced by a conventional cell, such as one employing $Ag_3SI$, for example.

To ascertain whether conduction in an electrolyte according to the invention is electronic or ionic, there was effected a test employing the cell constructed in reference to FIG. 2B. Sample No. 4' was used as a chip 1', silver amalgam was put into one compartment 4a', to serve as the anode, and mercury was put into the other compartment 4b', to serve as the cathode. The method of the test was to presume ionic conduction and to calculate the amount of silver expected to be deposited at the cathode for a particular current flowing in the cell, and then to measure actual deposits at this current. The results of the test showed that the amount of silver actually deposited at the cathode was 99 ± 1% the calculated amount, and it was therefore concluded that conduction in the electrolyte is ionic.

As is clear from the above description, the present invention provides a novel type of electrolyte, which not only has good electrical qualities, but also provided the particular advantage of being in a vitreous state. The electrolytes according to the invention are therefrom versatile and easy to use, and as well as being used in the same manner as conventional solid electrolytes, may also be used in sputtering, or other techniques which are completely unemployable with conventional solid electrolytes, and presents particular advantages in use for voltage supplies or other elements in small-scale electronic circuits.

What is claimed is:

1. In a method of using a solid electrolyte in a silver ion concentration cell, the improvement wherein the solid electrolyte is a vitreous solid electrolyte composition of the formula As-S-Ag lying within the range defined by the quadrilateral having apices $As_{34}S_{56}Ag_{10}$, $As_{20}S_{50}Ag_{30}$, $As_{16}S_{44}Ag_{40}$, $As_{23.5}S_{46.5}Ag_{30}$ in the triangular phase diagram indicating the atomic percentages of As-S-Ag in FIG. 1B of the attached drawing.

2. In a method of using a solid electrolyte in a temperature sensing element utilizing the change in resistivity at different temperatures to determine the temperature, the improvement wherein the solid electrolyte is a vitreous solid electrolyte composition of the formula As-S-Ag lying within the range defined by the quadrilateral having apices $As_{34}S_{56}Ag_{10}$, $As_{20}S_{50}Ag_{30}$, $As_{16}S_{44}Ag_{40}$, $As_{23.5}S_{46.5}Ag_{30}$ in the triangular phase diagram indicating the atomic percentages of As-S-Ag in FIG. 1B of the attached drawing.

3. In a method of using a solid electrolyte in a silver ion concentration cell, the improvement wherein the solid electrolyte is a vitreous solid electrolyte composition of the general formula $XAg_2S\text{-}yGeS\text{-}zGeS_2$, wherein $x$, $y$, $z$ represent molar percentages, $x + y + z = 100$, $x$ has a numerical value lying between 10 and 50, $y$ has a numerical value lying between 5 and 75, and $z$ has a numerical value lying between 5 and 55, the range of said composition being indicated in the area enclosed by the dotted line in the triangular phase diagram indicating the molar percentages of $GeS_2\text{-}GeS\text{-}Ag_2S$ in FIG. 6 of the attached drawing.

4. In a method of using a solid electrolyte in a temperature sensing element utilizing the change in resistivity at different temperatures to determine the temperature, the improvement wherein the solid electrolyte is a vitreous solid electrolyte composition of the general formula $xAg_2S\text{-}yGeS\text{-}zGeS_2$, wherein $x$, $y$ and $z$ represent molar percentages, $x + y + z = 100$, $x$ has a numerical value lying between 10 and 50, $y$ has a numerical value lying between 5 and 75, and $z$ has a numerical value lying between 5 and 55, the range of said composition being indicated in the area enclosed by the dotted line in the triangular phase diagram indicating the molar percentages of $GeS_2\text{-}GeS\text{-}Ag_2S$ in FIG. 6 of the attached drawing.

* * * * *